US012691661B2

(12) United States Patent
Schulze et al.

(10) Patent No.: US 12,691,661 B2
(45) Date of Patent: Jul. 28, 2026

(54) SOUND INSULATION WITH MULTILAYER FIBER INSULATION; AND METHOD OF MANUFACTURING THE SAME

(71) Applicant: Adler Pelzer Holding GmbH, Hagen (DE)

(72) Inventors: Volkmar Schulze, Schierling (DE); Reimund Piatkowski, Dortmund (DE); Nora Jestel, Bochum (DE)

(73) Assignee: ADLER PELZER HOLDING GMBH, Hagen (DE)

( * ) Notice: Subject to any disclaimer, the term of this patent is extended or adjusted under 35 U.S.C. 154(b) by 355 days.

(21) Appl. No.: 18/274,977

(22) PCT Filed: Dec. 22, 2021

(86) PCT No.: PCT/EP2021/087420
§ 371 (c)(1),
(2) Date: Jul. 28, 2023

(87) PCT Pub. No.: WO2022/161718
PCT Pub. Date: Aug. 4, 2022

(65) Prior Publication Data
US 2024/0149554 A1 May 9, 2024

(30) Foreign Application Priority Data

Jan. 28, 2021 (DE) .......................... 102021101922.2

(51) Int. Cl.
B32B 37/10 (2006.01)
B29C 51/00 (2006.01)
(Continued)

(52) U.S. Cl.
CPC .............. *B32B 5/26* (2013.01); *B29C 51/004* (2013.01); *B29D 99/0057* (2013.01);
(Continued)

(58) Field of Classification Search
CPC ....... B05C 19/001; B05C 19/002; B05D 1/14; B05D 1/16; B29C 43/003; B29C 43/10;
(Continued)

(56) References Cited

U.S. PATENT DOCUMENTS 3,329,553 A   7/1967  Sims et al. ...................... 161/64
4,131,664 A * 12/1978  Flowers .................... B32B 1/00
                                                      428/218
(Continued)

FOREIGN PATENT DOCUMENTS

DE          3623789        1/1988   ............. G10K 11/16
DE          3905607        8/1990   ............... B32B 5/24
(Continued)

OTHER PUBLICATIONS

Search Report issued in German Patent Appln. Serial No. 10 2021 101 921.4, dated Oct. 11, 2021, with machine English translation, 14 pages.
(Continued)

*Primary Examiner* — Michael A Tolin
(74) *Attorney, Agent, or Firm* — HAYES SOLOWAY P.C.

(57) ABSTRACT

Disclosed is a floor covering insulation for a motor vehicle with a multi-layer, preferably flocked, fibre insulation which, by a soft/smooth coupling layer to the wear surface, realises a sound insulation floor covering with improved acoustic and mechanical-physical properties, with a simultaneous reduction in weight if possible. Also disclosed is a method for manufacturing the sound insulation.

7 Claims, 2 Drawing Sheets

(51) Int. Cl.

| | |
|---|---|
| *B29D 99/00* | (2010.01) |
| *B32B 5/26* | (2006.01) |
| *B32B 38/00* | (2006.01) |
| *B32B 38/18* | (2006.01) |
| *B32B 43/00* | (2006.01) |
| *B60R 13/08* | (2006.01) |
| B29L 31/30 | (2006.01) |

(52) U.S. Cl.
CPC ...... *B32B 37/1009* (2013.01); *B32B 38/0004* (2013.01); *B32B 38/1808* (2013.01); *B32B 38/1833* (2013.01); *B32B 43/003* (2013.01); *B60R 13/0815* (2013.01); *B29L 2031/3017* (2013.01); *B32B 2307/102* (2013.01); *B32B 2310/049* (2013.01)

(58) Field of Classification Search
CPC .............. B29C 43/146; B29C 43/203; B29C 2043/189; B29C 51/004; B29C 51/10; B29D 99/0057; B29L 2031/3017; B29L 2031/7322; B29L 2031/7324; B29L 2031/7652; B32B 5/02; B32B 5/022; B32B 5/24; B32B 5/26; B32B 5/265; B32B 5/266; B32B 7/02; B32B 7/022; B32B 7/12; B32B 27/12; B32B 37/06; B32B 37/08; B32B 37/1009; B32B 37/1018; B32B 37/12; B32B 37/1207; B32B 38/0004; B32B 38/04; B32B 38/1808; B32B 38/1825; B32B 38/1833; B32B 38/1841; B32B 2038/042; B32B 43/003; B32B 2250/04; B32B 2250/05; B32B 2255/02; B32B 2307/102; B32B 2307/536; B32B 2310/049; B32B 2471/00; B32B 2471/02; B32B 2471/04; B32B 2605/003; B60R 13/08; B60R 13/0815; D06N 7/0063; D06N 7/0068; D06N 7/0071; D06N 7/0081; D06N 7/0097; D06N 2209/025; D06N 2211/066
See application file for complete search history.

(56) References Cited

U.S. PATENT DOCUMENTS

| | | | | |
|---|---|---|---|---|
| 5,064,714 | A | 11/1991 | Yamaguchi et al. | .......... 428/219 |
| 9,321,412 | B2 | 4/2016 | Ikeji et al. | .............. B60R 13/02 |
| 2004/0037995 | A1 | 2/2004 | Nicolai et al. | |
| 2005/0016793 | A1 | 1/2005 | O'Regan et al. | |
| 2005/0064779 | A1* | 3/2005 | Allison | ................ D06N 7/0089 156/72 |
| 2007/0151658 | A1 | 7/2007 | Khambete et al. | |
| 2009/0155520 | A1 | 6/2009 | Roers et al. | .................... 428/95 |
| 2011/0083792 | A1 | 4/2011 | Vollmert et al. | |
| 2013/0153331 | A1 | 6/2013 | Schneider et al. | |
| 2015/0118437 | A1 | 4/2015 | Schulze et al. | ....... B60R 13/083 |
| 2015/0267401 | A1 | 9/2015 | Nicolai et al. | |
| 2015/0298369 | A1 | 10/2015 | Nicolai et al. | .......... B29C 44/06 |
| 2016/0265157 | A1 | 9/2016 | Rice et al. | .......... D06N 7/0097 |
| 2017/0008462 | A1 | 1/2017 | Taniguchi et al. | .... B60R 13/083 |
| 2019/0009447 | A1 | 1/2019 | Nicolai et al. | |
| 2020/0023793 | A1 | 1/2020 | Schulze et al. | |
| 2020/0171993 | A1 | 6/2020 | Loisier et al. | |
| 2022/0073013 | A1 | 3/2022 | Schulze et al. | |
| 2022/0203649 | A1 | 6/2022 | Schulze et al. | ......... B32B 5/245 |

FOREIGN PATENT DOCUMENTS

| | | | |
|---|---|---|---|
| DE | 68912052 | 4/1994 | ............ B60G 13/08 |
| DE | 19960945 | 6/2001 | .............. B60N 3/04 |
| DE | 102006001036 | 7/2007 | ............ D04H 11/00 |
| DE | 202008004918 | 8/2008 | .......... G10K 11/168 |
| DE | 102007036952 | 2/2009 | ............ B60R 13/08 |
| DE | 102008013808 | 9/2009 | ............ B29C 70/30 |
| DE | 102008017893 | 10/2009 | .............. B60N 3/04 |
| DE | 102009058819 | 8/2010 | ............ B62D 25/20 |
| DE | 102010050336 | 5/2011 | ............ B60R 13/08 |
| DE | 102012222000 | 6/2014 | ............ B32B 37/10 |
| DE | 202020101433 | 4/2020 | .............. D04H 1/42 |
| EP | 0169627 | 3/1985 | .............. D06N 7/00 |
| EP | 0210102 | 7/1985 | .............. D06N 7/00 |
| EP | 1598476 | 11/2005 | .............. D06N 7/00 |
| EP | 2050865 | 4/2009 | .............. D06N 7/00 |
| JP | S5067639 | 6/1975 | .............. H04R 7/02 |
| WO | 2004071758 | 8/2004 | .............. B32B 3/06 |
| WO | 2006032433 | 3/2006 | .............. D06N 7/00 |
| WO | 2013167408 | 11/2013 | .............. D06N 7/00 |
| WO | 2019238398 | 12/2019 | ............ B29B 13/02 |
| WO | 2020216745 | 10/2020 | .............. B32B 5/06 |

OTHER PUBLICATIONS

International Search Report and Written Opinion issued in PCT/EP2021/087419, dated Apr. 19, 2022, with English translation, 18 pages.

Search Report issued in German Patent Appln. Serial No. 10 2021 101 922.2, dated Oct. 11, 2021, with machine English translation, 15 pages.

International Search Report, Written Opinion and International Preliminary Report on Patentability issued in PCT/EP2021/087420, dated Apr. 19, 2022, with English translation, 23 pages.

International Preliminary Report on Patentability issued in PCT/EP2021/087419, dated Jul. 31, 2023, 6 pages.

"Cellular rubber (ZK) Poly Foam Kautschuk Gmbh" https://www.polyfoam.de/werkstoffe.php, 7 pages.

Dimer "Malamine foam DIM BTS" https://www.dimer.com/en/Materials/melamine-foam.html, 1 page.

European Standard EN ISO 3386-1 Nov. 1997, Apr. 2010, 9 pages.

European Standard EN ISO 15186-1 Jul. 2003, 17 pages.

"Typenprogramm Spezialschaumstoffe Produktbeschreibung" Foaming Ideas Metzeler, Apr. 4, 2013, 21 pages.

\* cited by examiner

SOUND INSULATION WITH MULTILAYER FIBER INSULATION; AND METHOD OF MANUFACTURING THE SAME

An object of the invention is a floor covering insulation or a sound-insulating lining and, in particular, a floor covering for a motor vehicle, which has an insulation device having fibers and/or consisting of or having flocked fiber layers/ layers, which can differ zonally (partially) over the surface and/or thickness of the insulation in its mechanical-physical and acoustic properties; and a method for its manufacture.

The floor coverings used in motor vehicles today generally have material structures that include a wear layer/ surface (visible/surface) and layers underneath, in particular adhesive layers, acoustic/strengthening fleeces, sealing and heavy foils as well as contact/foil fleeces and/or the insulation.

In the state of the art, various designs of floor covering utility surfaces are known; tufted, velour and flat needlefelt carpets are widely used. In particular, for vans, SUVs, pickups and light commercial vehicles, rubber, PUR-RIM, PVC and increasingly TPO (surface-textured/with grain) are also used in the state of the art as a floor covering.

For tufted carpets, the state of the art uses in particular PA6.6, PA6, PP, rPA and PET, rPET as well as the bio-based polyamides (PA 5.10; PA 6.10) or wool as yarn/fiber material. In the field of velour and flat needlefelt carpets, PET, PET/PP, PP, PA/PET and rPET are predominantly used as yarn/fiber material. The tufting backing for the tufting qualities is mostly made of PET/PP, PET/coPET or PET/PA.

The fiber bindings used here mainly include EVA and PE for tufted carpets and SBR latex or acrylate for velour and flat needlepunch carpets. Furthermore, films, nonwovens, adhesives (hot melts), thermoplastics (mainly PE) and the thermo-bonding process described in EP 1 598 476 B1 are used for velour and flat needlepunch carpets. Furthermore, bonding fibers, EVA or thermoplastic dispersions are increasingly used.

The underlays, such as acoustic and/or stiffening fleeces, usually consist of PET and mixed fiber fleeces, often with a BiCo fiber content. PE/PA and PE/PA/PE films as well as PE/PA/PE+PET film nonwovens are used as sealing or insulating films. Depending on the acoustic requirements, so-called heavy foils are also used as partial and/or full-surface insulating foils.

Between the top layer (wear layer plus underlays) and the car body floor there is usually an insulation layer, which is in particular made of PUR foam or fleece structures (fleece or fiber flock (HMP) composites). If a foam is used, it is firmly bonded (for example foamed) to the upper material. Non-woven/fiber flock structures can also be firmly bonded to the upper material, wherein these are then usually glued or also fused. However, it is also possible to lay them on top of each other without a fixed connection.

The following floor covering insulations are known in the prior art: DE 39 05 607 A1 and WO 2006/032433 A1 describe a viscoelastic foam. DE 10 2008 017 893 A1 describes a cut foam (thermoformed foam). EP 0 210 102 B1 and EP 0 169 627 A2 describe a foam with partially different density. In addition, nonwovens as well as preformed non-wovens are also known.

US 2017/0008462 A1 and U.S. Pat. No. 9,321,412 B2 describe nonwovens with standing and/or vertical fiber orientation. Furthermore, a pressed fiber material consisting of fiber balls is known from DE 20 2020 101 433 U1.

It is also known from the applicant's internal prior art that so-called crash elements, foot mat fastening elements and foot rest elements are integrated in the insulation. EPS, EPP and PEPP inserts are also primarily placed in the insulation in order to increase the step stiffness, among other things.

DE 10 2009 058 819 A1 describes a structure with spacers for this purpose. It is also known to foam composite foam pieces (DE 36 23 789 A1). DE 20 2008 004 918 U1 states that anti-drumming films are (partially) applied to the carpet composite at several points in a force-fit or fabric-fit manner.

The advantage of using fiber insulation produced in the fiber flock (HMP) process is mainly that the weight per unit area of the insulation can be influenced to a large extent over the surface of the component—adapted locally to the requirements.

The process described in DE 10 2008 013 808 A1 allows, in particular through the use of baffles and special throttles, a demand-oriented distribution of the fiber/flock mixture over the surface of the insulation to be produced.

SUMMARY OF THE INVENTION

The object of the present invention compared to the aforementioned prior art is thus to provide a multilayer insulation with at least one (preferably flocked) fiber layer which, by means of a soft/smooth coupling layer to the wear surface, realises a sound insulation-floor covering system with improved acoustic and mechanical-physical properties. This can go hand in hand with a simultaneous weight reduction.

Furthermore, the provision of a method for manufacturing the sound insulation.

The aim here is to improve the acoustic effectiveness of floor covering systems in motor vehicles; as a result of a soft/gentle coupling of the fiber insulation as a whole to a wear layer (i.e. in particular an upper layer) with the layers underneath, preferably accompanied by a density reduction of the very fiber insulation or insulation device and thus a weight optimisation.

The present invention relates to a sound-insulating floor covering for a motor vehicle, which comprises an insulating device comprising fibers, wherein said insulating device extends along a longitudinal direction, a width direction and a thickness direction and wherein said insulating device preferably has different and/or varying acoustic and/or mechanical-physical properties in at least one of said directions and wherein said insulating device comprises a material and/or a material structure and at least one adhesive layer, as well as at least one non-woven element and at least one foil element.

According to the invention, the insulation device has a multilayer structure and at least one layer of this insulation device is a (preferably flocked) layer with fibers and this insulation device is connected to and/or arranged on a wear surface of the insulation device by means of a coupling layer, wherein this coupling layer has a compression hardness which is in a range between 0.2 kPa and 5 kPa, preferably 0.5 to 2 kPa.

Furthermore, the insulation device has a flocked fiber layer (22) facing a vehicle floor, the compression hardness of which is in the range of 5 kPa and 30 kPa, preferably between 10 kPa and 20 kPa.

Preferably, the compression hardness of the fiber layer is at least twice as great as the compression hardness of the coupling layer, preferably at least 3 times as great, preferably at least 5 times as great. Preferably, the compression hardness of the fiber layer is at most 30 times as great as the compression hardness of the coupling layer, preferably at most 20 times as great and preferably at most 10 times as great.

The compression hardness is determined in particular according to DIN EN ISO 3386-1 [The determination is made at a deformation of 40% (ISO 3386-1 CC40) measured on the individual layers separated with a sharp knife. Preferably, the compression hardness indicates how much pressure in kPa is required to compress the material, for example a foam, by 40 percent.

Preferably, the acoustic property is a sound insulation (and/or sound transmission loss), which can be measured, for example, by means of a measurement method according to DIN EN ISO 15186-1.

Preferably, the at least one mechanical property is selected from a group of properties including a density and a compression hardness.

By different properties in at least one of the directions it is understood that in at least one area lying along these directions different properties are present than in another area. Preferably, the properties change in the corresponding direction. It is conceivable that these properties change gradually or continuously, but also that these properties change in steps. Preferably, these properties change in several of the said directions and preferably in all of the said directions. Thus, said properties may in particular also change in the thickness direction of the cladding, which is based in particular on materials changing in said direction. Particularly preferably, said properties change in the thickness direction.

Preferably, the material structure has a material that is selected from a group of materials that concern needled nonwoven, velour and tufted carpets, TPO layers (with and without grain) as well as PVC layers as a wear layer [visible/surface]. Preferably, this material or material structure forms a wear surface. The sub-layers are adhesive layers, preferably PE, acoustic/stiffening nonwovens of different fiber types or with different fiber mixes, sealing and contact/film nonwovens, preferably PE-, PA-, EVA- and PET-fiber-based; as well as heavy films, mostly PE-, PP-, EPDM-based.

The subject matter of the present invention is thus preferably, in a first embodiment, a sound insulation floor covering for a motor vehicle, with fiber insulation or insulation device, which preferably has different acoustic and/or mechanical-physical properties over the thickness of the insulation device, as a result of which in particular the entire sound insulation floor covering obtains the desired mechanical-physical properties (such as e.g. slip resistance) with simultaneously good acoustic properties (in particular sound transmission loss) and preferably reduced weight.

In particular, consisting of the material structure wear surface with adhesive layers and/or acoustic/stiffening nonwovens and/or sealing and heavy foils and/or contact/foil nonwovens located underneath.

In particular, the fiber insulation (also referred to above as insulation device) has a multilayer structure and in particular at least one layer is flocked and/or consists of fibers, and the layer facing the wear surface guarantees a soft/smooth coupling, in particular in that the compression hardness of the coupling layer is in the range from 0.2 kPa to 5 kPa, preferably 0.5 kPa to 2 kPa, and/or the compression hardness of the underlying fiber layer facing the motor vehicle floor is in the range from 5 kPa to 30 kPa, preferably 10 kPa to 20 kPa.

In a preferred embodiment, the insulation device thus has a fiber layer facing the vehicle floor and, particularly preferably, this further fiber layer has a compression hardness in a range between 5 kPa and 30 kPa.

In a further advantageous embodiment, the insulation device comprises a binder and/or a filler material.

In a further advantageous embodiment, the filler material is selected from a group of filler materials containing natural fibers, plastic fibers, lumpy filler material made of plastic, in particular based on foamed PP (or EPP or PEPP), foamed PS (and/or EPS), PUR chips or natural substances, in particular cork granulate or rayon wool or combinations of these materials.

In a further preferred embodiment, the filling material and in particular the rayon (in particular solid) has individual phases with a multi-leg cross-sectional shape with at least three legs, in which preferably the legs of the cross-sectional profile each have a length/width ratio of at least 2:1.

In a further preferred embodiment, a single titre (of the filling materials) is 0.5 to 5 dtex.

In a further preferred embodiment, a wear layer of the floor covering can be positioned or positioned positively with the multilayer (advantageously flocked) insulation device in a motor vehicle. In this case, it is particularly advantageous that the individual layers of this multilayer composite are firmly and/or positively connected to one another.

In a further preferred embodiment, the insulation device has thermoplastic binders in fiber form, which are based in particular on PP, PET-BiCo, A-PET and/or PE.

The present invention is further directed to a motor vehicle and, more particularly, a road motor vehicle having a floor covering of the type described above.

The present invention is further directed to a method of manufacturing the sound insulation floor covering comprising multi-layer flocked fiber insulation and/or a multi-layer insulation device.

In this process, first a first layer (in particular a fiber layer) with a compression hardness in the range of 5 kPa to 30 kPa and then a second layer, in particular a second fiber layer with a compression hardness in the range of 0.2 kPa to 5 kPa, is applied to this first fiber layer and in particular flocked.

In a further method step, the two-layer insulation device formed in the flocking device (which is in particular a flock box) is transported from the flocking device into a steam and/or vacuum tool. In a preferred method, the insulation device is transported by means of a gripper tool. In a further preferred method, the insulation device is positioned at a predetermined position within the steam and/or vacuum tool.

The present invention is further directed to a method of manufacturing a sound insulating floor covering, in particular for a motor vehicle, wherein said floor covering comprising an insulating device comprising fibers and/or a multilayer flocked insulating device (i.e. in particular at least one layer produced by a flocking process). Preferably, the insulation device is an at least two-layer insulation device.

According to the invention, first a first and then a second layer is flocked in a flocking device, wherein (in particular depending on the subsequent process) the sequence of the material quality and/or the layers is selected in such a way that the layer later facing the wear surface has a predetermined compression hardness and, in particular, a compression hardness in the range from 0.2 kPa to 5 kPa and the other layer has a predetermined compression hardness and, in particular, a compression hardness in the range from 5 kPa to 30 kPa.

Alternatively or additionally, in a further variant according to the invention, first a first fiber layer with a compression hardness in the range from 5 kPa to 30 kPa is applied in a flocking device, such as in particular but not exclusively a so-called flock box, and then a second fiber layer with a compression hardness in the range from 0.2 kPa to 5 kPa is applied to this first fiber layer and in particular flocked; optionally also applied as a nonwoven sheet.

Preferably, the first layer is the above-mentioned fiber layer and the second layer is the above-mentioned coupling layer.

Furthermore, this two-layer insulation device formed in the flocking device is transported or transferred from the flocking device into a steam/vacuum tool. In a preferred method, the insulation device is transported into the steam/vacuum tool by means of a gripping device, in particular a so-called gripper. Particularly preferably, the insulation device is rotated before, during or after transport. In particular, the insulation device is rotated so that the coupling layer is on top.

Preferably, this insulation device is formed at least on one side and at least on the vehicle floor side. Preferably, this shaping is carried out taking into account a corresponding contour of the motor vehicle. This forming is preferably also carried out in the flocking device. The motor vehicle is in particular a road motor vehicle.

In a further preferred method, the insulation device is positioned within the steam/vacuum tool and/or located at a predetermined position within the steam/vacuum tool. Preferably, the steam/vacuum tool is then closed (in particular to allow steam to be applied to the insulation device).

In a further preferred method, by applying steam, usually from the underside of the two-layer insulation device, in the insulation device—which contains a binder—the binder is activated and the wear layer (preferably preformed in a separate process step) is bonded with the two-layer fiber insulation.

Preferably, further sub-layers can be connected to this insulation device.

Preferably, the insulation device contains a binder or binding substance. In a preferred method, a binder present in the insulation device is activated by the application of steam and preferably at least the two-layer insulation device solidifies within itself.

In a further preferred method, a steam pressure is relieved by a lower pressure on the upper side (of the insulation device) compared to a pressure on the lower side of the insulation device.

In a further preferred method, a wear layer with at least one dense underlayer is inserted into the steam/vacuum tool with its rear side over the preformed layer of the insulation device, which contains a binder. After this insertion, the steam/vacuum tool is preferably closed.

Particularly preferably, the two-layer insulation device is connected to the wear layer (with at least one sub-layer) by the second layer, wherein this sub-layer is preferably a dense (in particular liquid- and/or gas-tight) layer.

In a further preferred method, the resulting component, i.e. the floor covering, is cooled (in particular after the above-mentioned joining). This cooling can take place in particular in a calibration tool or a storage tray.

In a further preferred method, the resulting component is cut at least in sections and preferably completely. This cutting can preferably be done with a water jet and/or by means of a punch cut.

The present invention is further directed to a method of manufacturing a sound-insulating floor covering comprising a multilayer insulation device, wherein said insulation device extends along a longitudinal direction, a width direction and a thickness direction, and wherein said insulation device preferably has different acoustic and/or mechanical-physical properties in at least one of said directions and/or which has different acoustic and mechanical-physical properties over the area and thickness of the insulation device, and wherein said floor covering has a material structure which preferably comprises at least one non-woven element and at least one foil element.

Preferably, a fiber layer facing a motor vehicle floor in an installed state is flocked in a flocking device and according to the invention, at least this fiber layer (facing the vehicle floor) is transported into a steam/vacuum tool and by applying steam (mostly from an underside of the insulation device) a binder present in the insulation device is activated and further the insulation device is cooled, cut and positioned in a motor vehicle.

In a preferred method, a wear layer and in particular the above-mentioned wear layer is deformed, which is done in particular in a separate process.

In a further advantageous method, the floor covering has a coupling layer and this coupling layer is formed and in particular preformed by means of air, in particular by application of air or by suction of air or by application of a negative pressure.

This preforming is particularly preferably carried out in a suction device, such as in particular but not exclusively in a suction cup. In a preferred method, the coupling layer is formed as a blank, wherein the coupling layer, particularly preferably before preforming, extends in a longitudinal direction and a width direction and in a thickness direction that is considerably shorter than this longitudinal direction and the width direction. Preferably, this coupling layer serves to bind or attach the fiber layer to the useful layer (or its sublayers).

In a further preferred method, the coupling layer is transported into the flocking device. Thus, it is preferably possible for a gripping device to drive into the flocking device with the preformed coupling layer or to transport the coupling layer into the flocking device.

Alternatively or additionally, it is possible that the coupling layer and the fiber layer are brought together. In this case, the gripping device preferably picks up the fiber layer located in the flocking device.

In a further preferred method, the layers (in particular those lying on top of each other), i.e. the coupling layer and the fiber layer, are deposited in the steam-vacuum tool. This can be done by the gripping device. Preferably, the steam-vacuum tool is then closed. Preferably, the application of steam or a heated gaseous medium in general solidifies the insulation device or the two-layer fiber insulation.

In a further advantageous method, the coupling layer and the fiber layer are deposited (in particular together) in the steam-vacuum tool. Preferably, this step is followed by cooling of the (solidified) layers.

In a further preferred method, the deformed wear layer (in particular with the underlayers) and the insulation device are each cut in separate processes and joined together and/or positioned as a floor covering system in a motor vehicle. Preferably, this cutting is done by means of a water jet or by a punching process. The layers can be glued together to effect the bonding. However, it would also be conceivable for the layers to be positioned loosely and/or in particular positively as a floor covering system or as the above-mentioned floor covering in the vehicle.

In a further preferred method, the deformed wear layer with the sub-layers is bonded to the insulation device, in particular glued, then cut and subsequently positioned in a motor vehicle. In this case, it is conceivable and preferred that the multiple layers are cut as a layer composite, for example by means of a water jet or by means of a punching process, and that the cut composite is then positioned in the motor vehicle.

In a further preferred method, a wear layer with sub-layers is heated in a separate heating device. In a further optional process step, the flocked fiber layer (later in the component) facing the motor vehicle floor is removed from the flocking device, in particular by means of a gripping device, and preferably deposited in the steam-vacuum tool. Preferably, this layer composite has a sealing layer and a coupling layer.

In a further preferred method, the fiber layer is deposited in the steam/vacuum tool and the wear layer is also deposited (in particular including the underlayers and the coupling layer) in the steam/vacuum tool and in particular above the fiber layer. This can again be done by means of a gripping device.

In further optional process steps, the steam-vacuum tool is closed and all layers are consolidated, i.e. in particular the wear layer is bonded to the sub-layers (in particular a sealing layer) and the coupling layer, as well as the fiber layer. This is preferably followed by cooling in a calibration tool or a storage tray. Preferably, this is followed by cutting and positioning in a vehicle.

In a further preferred method, the wear layer with sublayers, (in particular at least one sealing layer), is heated in a separate heating station. In a further and in particular subsequent process step, the coupling layer is preformed. Further and in particular subsequently, the preformed coupling layer is transported into the flocking device and the fiber layer located there is taken up.

In a further and in particular subsequent process step, the two superimposed fiber layers—which in particular contain a binder—are deposited in the steam-vacuum tool and by means of transfers the heated wear layer with sublayers, in particular a sealing layer, is deposited over the fiber layer and the coupling layer.

Preferably, the application of steam, in particular from the underside of the fiber insulation containing a binder, activates this binder and consolidates the fiber layers.

In a further preferred method, the wear layer is bonded to the fiber insulation with the underlayers, in particular a sealing layer, then preferably the floor covering system is cooled in a calibration tool or storage tray, then trimmed and finally the floor covering system or floor covering is positioned in a motor vehicle.

In a further preferred method, a layer and in particular a coupling layer is deposited on a gripping device by means of a flow tube and this gripping device is transported with this layer into the flocking device and the fiber layer located there is picked up and the two superimposed layers are transported to the steam-vacuum tool.

It is also practicable to trim the wear layer with, if necessary, sub-layers with the two-layer fiber insulation separately with a water jet or a punch and then glue them together or position them loosely (form-fitting) in the motor vehicle.

From the point of view of recyclability and sustainability, it is advantageous to replace the (viscoelastic) PU foam used as insulation today, especially in the premium segment of motor vehicles, with fiber materials. Thus, it is preferably also intended to "imitate" the particularly acoustic behaviour of a (viscoelastic) PU foam with a fiber insulation; preferably with a simultaneous weight reduction if possible.

One aspect of the present invention is thus the provision of a floor covering for motor vehicles and the method for producing the same, with a flocked fiber insulation (referred to above as insulation device), which has at least one flocked fiber layer/layer, has two flocked fiber layers/layers, which differ zone-wise (partially) over the area and/or, in particular, the thickness of the insulation in their mechanical-physical and/or acoustic properties; wherein the at least two-layer insulation corresponds in its acoustic effectiveness to that of a PU foam insulation, possibly surpassing it, preferably with a simultaneous reduction in weight if possible.

The advantage of the present invention consists in the provision of floor coverings for motor vehicles which have at least two layers of insulation, in particular insulation containing fibers, so that a soft coupling can take place to the wear layer with any if necessary sub-layers underneath, so that its mechanical-physical and in particular acoustic properties can also be influenced and/or tuned zonally (partially) via the surface and thickness of the insulation and, if possible, at the same time a weight reduction takes place. In addition, the recyclability and the use of recycled material should also be mentioned here. The at least two-layer insulation can preferably also include foam layers.

BRIEF DESCRIPTION OF THE DRAWINGS

Further advantages and embodiments can be seen in the attached figures. In the drawings.

DETAILED DESCRIPTION OF THE INVENTION

Figure 1:
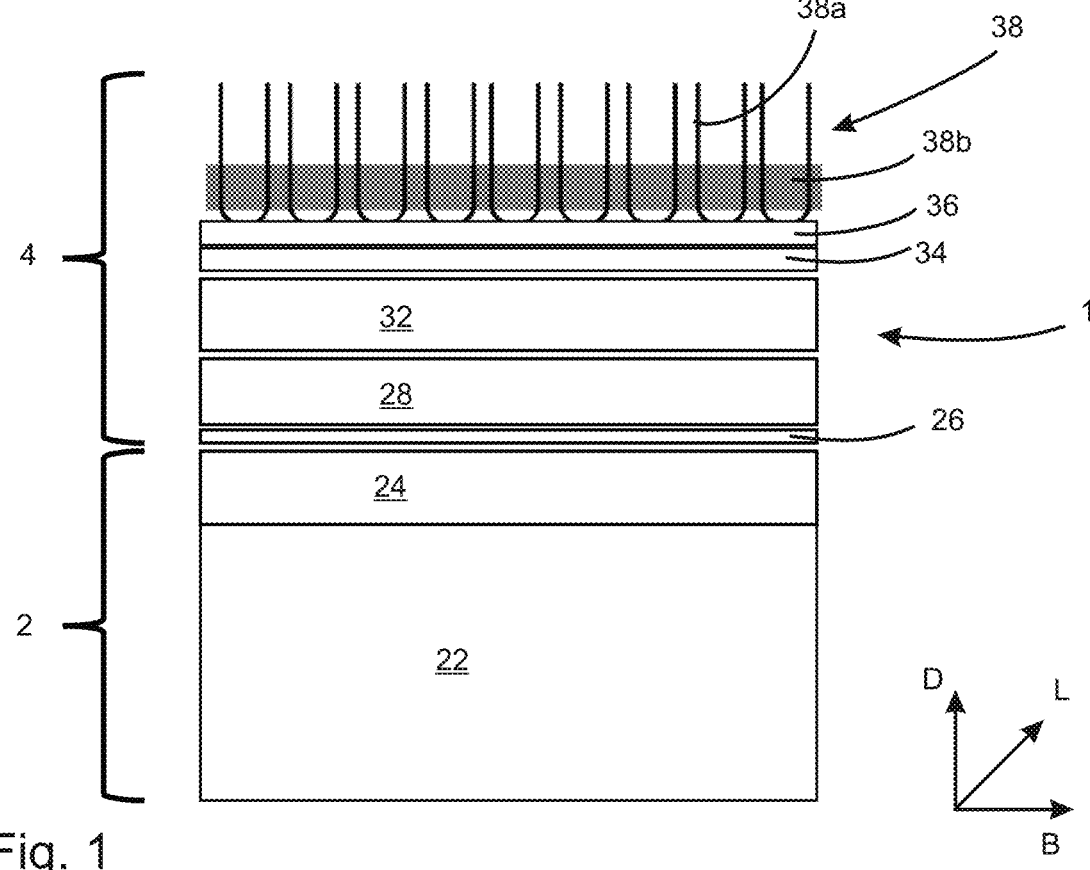
FIG. 1 shows a roughly schematic representation of a composite according to the invention.

FIG. 1 shows a composite according to the invention or a sound-insulating floor covering 1 for a motor vehicle according to the invention. This floor covering 1 has an insulation device 2 and a material structure 4 connected to this insulation device. This material structure is the wear layer with its sub-layers.

The insulation device 2 has a coupling layer 24 and a flocked fiber layer 22. These two layers preferably each have consolidated binders.

The material structure 4 again has a plurality of sub-layers. The reference sign 28 refers to a heavy foil, and the reference sign 26 refers to a sealing foil. The heavy foil 28 and the sealing foil 26 are preferably formed together. The reference sign 32 identifies a stiffening and/or acoustic fleece. The reference sign 34 indicates a coating and the reference sign 36 indicates a binding, which serves in particular to bind the wear layer or the top layer. This layer 38 can preferably be formed as a tufted carpet and this advantageously has yarn (pile) 38a and a carrier 38b.

Figure 2:
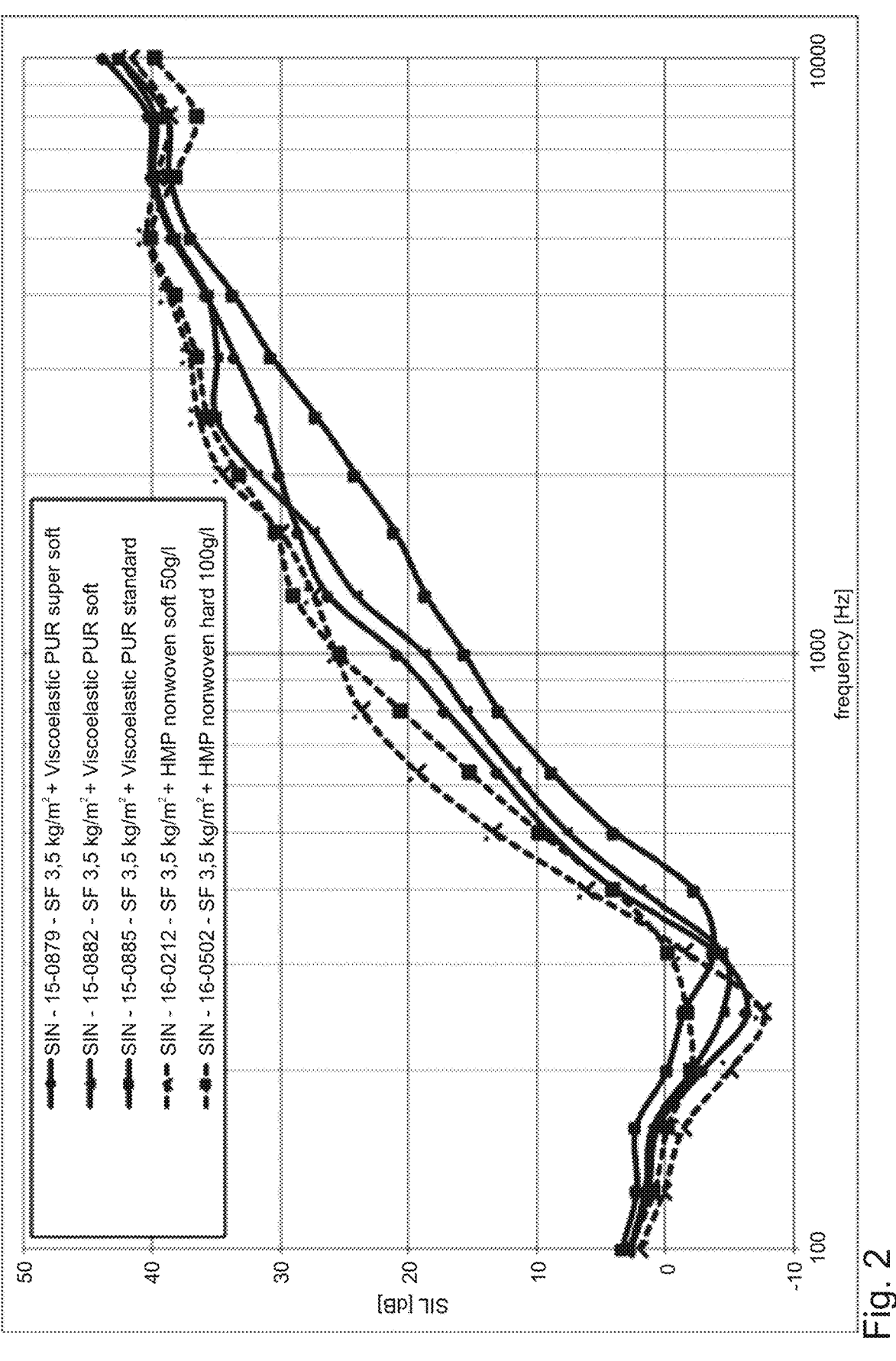
FIG. 2 shows a diagram showing the acoustic behaviour of the insulation device.

FIG. 2 shows a diagram illustrating the acoustic behaviour of the insulation device according to the invention or the floor covering according to the invention.

In order to prove the improvement of the in particular acoustic effectiveness by an at least two-layer flocked fiber insulation compared to the floor covering insulations made of PUR foam, which can be found in particular in the premium segment, different samples, in particular heavy foil plus viscoelastic PUR foam and heavy foil plus fiber flock insulation, were produced and measured.

FIG. 2 shows the result (insertion insulation according to ISO 15186-1 in the horizontal window test rig): The improved acoustic behaviour of the fiber flock (HMP)

insulation can be clearly seen. Compared to the viscoelastic PUR foam, an additional weight reduction of approx. 32% has been achieved with the fiber flock (HMP) insulation with 50 g/l.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. A method for producing a sound-insulating floor covering having a multilayer insulation device, wherein the insulation device extends along a longitudinal direction, a width direction and a thickness direction, and the insulation device has different acoustic, mechanical or physical properties in at least one of said directions, said method comprising the steps of:

(a) providing an insulation device comprising a coupling layer having a floor contacting layer in a form of a flocked fiber layer thereon;

(b) transporting the insulation device with the flocked fiber layer from step (al into a steam/vacuum tool and applying steam from an underside of the insulation device; and (c) cooling, cutting and positioning the insulation device from step (b) to fit in a motor vehicle.

2. The method according to claim 1, further comprising: providing a wear layer having a plurality of sublayers formed in a separate step and bonding the wear layer to the insulation device.

3. The method according to claim 2, further comprising: separately trimming the insulation device and the wear layer in a separate trimming step.

4. The method according to claim 2, wherein the wear layer includes underlayers, and the method further comprises heating the wear layer with underlayers in a separate heating device.

5. The method according to claim 1, wherein the coupling layer comprises a fiber layer, and the method further comprises consolidating the coupling laver and the flocked fiber layer by application of steam.

6. The method according to claim 5, wherein the step of cooling the insulation device is performed following the application of steam in a calibration tool or a storage tray, before cutting and positioning the insulation device in the motor vehicle.

7. The method according to claim 5, further comprising: depositing the insulation device on a gripping device using a flow tube, and employing the gripping device to transport the insulation device into the steam/vacuum tool.

* * * * *